(12) United States Patent
Sato et al.

(10) Patent No.: US 11,181,220 B2
(45) Date of Patent: Nov. 23, 2021

(54) METAL DIAPHRAGM DAMPER AND MANUFACTURING METHOD FOR THE SAME

(71) Applicant: Eagle Industry Co., Ltd., Tokyo (JP)

(72) Inventors: Yusuke Sato, Tokyo (JP); Toshiaki Iwa, Tokyo (JP); Yoshihiro Ogawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/762,113

(22) PCT Filed: Nov. 20, 2018

(86) PCT No.: PCT/JP2018/042766
§ 371 (c)(1),
(2) Date: May 6, 2020

(87) PCT Pub. No.: WO2019/102983
PCT Pub. Date: May 31, 2019

(65) Prior Publication Data
US 2020/0355311 A1 Nov. 12, 2020

(30) Foreign Application Priority Data

Nov. 24, 2017 (JP) .............................. JP2017-225531

(51) Int. Cl.
*F16L 55/053* (2006.01)
*F16J 3/02* (2006.01)
(Continued)

(52) U.S. Cl.
CPC ............... *F16L 55/053* (2013.01); *F16J 3/02* (2013.01); *F16J 15/52* (2013.01); *F02M 59/44* (2013.01)

(58) Field of Classification Search
CPC ............ F16L 55/053; F16J 3/02; F02M 59/44
(Continued)

(56) References Cited

U.S. PATENT DOCUMENTS

| 7,513,240 B2 * | 4/2009 | Usui | .................. F02M 37/0041 |
| | | | 123/446 |
| 9,057,348 B2 * | 6/2015 | Usui | ...................... F02M 55/04 |

(Continued)

FOREIGN PATENT DOCUMENTS

| EP | 1411236 | 4/2004 | ............. F02M 37/00 |
| JP | 51-127081 | 10/1976 | |

(Continued)

OTHER PUBLICATIONS

International Preliminary Report on Patentability issued in PCT/JP2018/042766, dated May 26, 2020, 7 pgs.

(Continued)

*Primary Examiner* — Craig M Schneider
*Assistant Examiner* — David R Deal
(74) *Attorney, Agent, or Firm* — Hayes Soloway P.C.

(57) ABSTRACT

A metal diaphragm damper includes disc-shaped damper main body having two diaphragms between which a gas is sealed and each of which is provided with a deformable portion at the center thereof and two regulation members that are disposed outside of the deformable portions of the two diaphragms. The metal diaphragm damper includes a first welding part provided with a first welding layer WD1 that seals an annular periphery portion of the regulation member and an outer edge portion of the diaphragm, and a second welding layer WD1 that seals an annular periphery portion of the other regulation member and an outer edge portion of the other diaphragm. The metal diaphragm damper further includes a second welding part provided with (Continued)

a welding layer WD2 that seals the annular periphery portions of the two regulation members.

6 Claims, 11 Drawing Sheets

(51) Int. Cl.
    *F16J 15/52*     (2006.01)
    *F02M 59/44*     (2006.01)

(58) Field of Classification Search
    USPC .......................................................... 138/30
    See application file for complete search history.

(56) References Cited

U.S. PATENT DOCUMENTS

| | | | | |
|---|---|---|---|---|
| 9,074,593 | B2* | 7/2015 | Kobayashi | F16L 55/0338 |
| 10,480,466 | B2* | 11/2019 | Tomitsuka | F02M 59/44 |
| 10,495,042 | B2* | 12/2019 | Iwa | F02M 37/0041 |
| 10,753,331 | B2* | 8/2020 | Iwa | F16F 1/048 |
| 10,883,462 | B2* | 1/2021 | Yabuuchi | F02M 37/0041 |
| 2006/0272144 | A1 | 12/2006 | Matsuki et al. | 29/463 |
| 2008/0289713 | A1* | 11/2008 | Munakata | F04B 11/0016 |
| | | | | 138/26 |
| 2009/0127356 | A1* | 5/2009 | Junger | F02M 47/027 |
| | | | | 239/585.1 |
| 2011/0017332 | A1* | 1/2011 | Bartsch | F16L 55/05 |
| | | | | 138/30 |
| 2013/0052064 | A1 | 2/2013 | Oikawa et al. | 417/540 |
| 2013/0276929 | A1 | 10/2013 | Oikawa | 138/26 |
| 2017/0335810 | A1 | 11/2017 | Tomitsuka et al. | |
| | | | | F02M 37/0041 |
| 2018/0209389 | A1 | 7/2018 | Iwa et al. | F02M 55/004 |

FOREIGN PATENT DOCUMENTS

| | | | |
|---|---|---|---|
| JP | 3-44646 | 4/1991 | ............ G01L 13/02 |
| JP | 2013-227877 | 11/2013 | ............ F02M 59/44 |
| JP | 2014-240658 | 12/2014 | ............ F02M 59/44 |
| JP | 2016-113922 | 6/2016 | ............ F02M 59/44 |
| WO | WO 2005/026585 | 3/2005 | ................ F16J 3/02 |
| WO | WO 2017/022603 | 2/2017 | ................ F16J 3/02 |

OTHER PUBLICATIONS

International Search Report and Written Opinion issued in PCT/JP2018/042766, dated Feb. 12, 2019, with English translation. 21 pgs.

European Search Report issued in corresponding EP Application Serial No. 18881633.4, dated Jun. 15, 2021 (7 Pgs).

Chinese Official Action issued in corresponding Chinese Application Serial No. 201880073748.0, dated Jul. 5, 2021 (15 pgs).

\* cited by examiner (a)

(b)

(a)

(b)

(a)

(b)

(a)

(b)

METAL DIAPHRAGM DAMPER AND MANUFACTURING METHOD FOR THE SAME

TECHNICAL FIELD

The present invention relates to a metal diaphragm damper that absorbs pulsation produced due to the delivery of a liquid by a pump or the like and a manufacturing method for the same.

BACKGROUND ART

For example, in driving an engine or the like, in order to compression-deliver fuel which is supplied from a fuel tank to an injector, a high-pressure fuel pump is used. The high-pressure fuel pump pressurizes and discharges fuel by the reciprocating motion of a plunger driven by the rotation of the cam shaft of an internal combustion engine.

As a mechanism of the pressurization and discharge of fuel in the high-pressure fuel pump, first, a suction process is performed in which when a plunger descends, a suction valve is opened and fuel is sucked from a fuel chamber that is formed on the fuel inlet side to a pressurizing chamber. Subsequently, a volume adjustment process is performed in which when the plunger ascends, and a part of fuel in the pressurizing chamber is returned to a fuel chamber. After the suction valve is closed, a pressurizing process is performed in which fuel is pressurized when the plunger further ascends. As described above, the high-pressure fuel pump repeats a cycle of the suction process, the volume adjustment process and the pressurizing process to pressurize and discharge the fuel to the injector side. By driving the high-pressure fuel pump in this manner, pulsation is produced in the fuel chamber.

In such a high-pressure fuel pump, a metal diaphragm damper that reduces pulsation which is produced in the fuel chamber is built in the fuel chamber. For example, Patent Citation 1 discloses such a metal diaphragm damper that includes a disc-shaped damper main body in which a gas is sealed between two diaphragms. The damper main body includes a deformable portion provided at the center thereof. The deformable portion receives a fuel pressure associated with pulsation and elastically deformed, and thus the capacity of the fuel chamber is made variable to reduce pulsation.

In the metal diaphragm damper disclosed in the Patent Citation 1, regulation members are disposed outside the deformable portions of the two diaphragms such that the damper main body is sandwiched, and the regulation members regulate deformation of the damper main body in the swelling direction. Thus, stress that repeatedly acts near the outer diameter edge of the deformable portions of the two diaphragms can be suppressed, and the durability of the damper main body is improved.

CITATION LIST

Patent Literature

Patent Citation 1: JP 2014-240658 A (page 8, FIG. 5).

SUMMARY OF INVENTION

Technical Problem

Here, in the metal diaphragm damper of the Patent Citation 1, the regulation members disposed so as to sandwich the damper main body each include, at the outer edge, an annular periphery portion that is formed in parallel with the outer edge portions of the two diaphragms. The outer edge portions of the two diaphragms, the annular periphery portion of one of the regulation members, and the annular periphery portion of the other of the regulation members, i.e., the side end portions of four plate parts are fixed throughout the circumference by welding. As described above, in the case in which the four plate portions are integrally welded, three boundary parts have to be welded in a state in which the four plate portions are laid on each other, the three boundary parts consisting of the first boundary part between the annular periphery portion of one of the regulation members and the outer edge portion of one of the two diaphragms, the second boundary part between the outer edge portions of the two diaphragms, and the third boundary part between the outer edge portion of the other of the two diaphragms and the annular periphery portion of the other of the regulation members. Since the welding is performed in a wide region, the welding accuracy between the diaphragms that specifically need hermeticity is degraded, leading to a risk that securing hermeticity fails.

The present invention is made by focusing attention on such a problem, and the object is to provide a metal diaphragm damper of excellent hermeticity and a manufacturing method for the same.

Solution to Problem

In order to solve the foregoing problem, a metal diaphragm damper according to the present invention, comprises: a damper main body formed in a disc shape and including a first diaphragm and a second diaphragm between which a gas is sealed and each of which is provided with a deformable portion at a center thereof; a first regulation member disposed outside the deformable portion of the first diaphragms; a second regulation member disposed outside the deformable portion of the second diaphragm; a first welding part provided with a first welding that is formed by welding to seal an annular periphery portion of the first regulation member and an outer edge portion of the first diaphragm, and a second welding layer that is formed by welding to seal an annular periphery portion of the second regulation member and an outer edge portion of the second diaphragm; and a second welding part provided with a welding layer that is formed by welding to seal the annular periphery portions of the first and second regulation members.

According to the aforesaid configuration of the metal diaphragm damper, the regulation member regulates the deformation of the damper main body in the swelling direction, and thus the durability of the damper main body can be improved. Since the annular periphery portion of the first regulation member and the outer edge portion of the first diaphragm are sealed with the first welding layer of the first welding part, the annular periphery portion of the second regulation member and the outer edge portion of the second diaphragm are sealed with the second welding layer of the first welding part, and the annular periphery portions of the first and second regulation members are sealed with the welding layer of the second welding part, the regions in which welding is performed are small. This means that welding of excellent accuracy can be performed, and that hermeticity is excellent.

Preferably, an outer diameter of the annular periphery portion of the first regulation member may be formed larger than an outer diameter of the first diaphragm, an outer diameter of the annular periphery portion of the second regulation member may be formed larger than an outer diameter of the second diaphragm, and the second welding part may be located radially outward with respect to the outer edge portions of the first and second diaphragms. In this case, in a process of sealing the damper main body, the annular periphery portions of the first and second regulation members only have to be welded, and the outer edge portions of the first and second diaphragms do not interfere. Thus, the annular periphery portions of the first and second regulation members can be highly accurately welded.

Preferably, each of the annular periphery portions of the first and second regulation members may have a recess formed in each of inner surfaces of the annular periphery portions facing to each other on a radially inner side of the annular periphery portions, and the outer edge portions of the first and second diaphragms may be disposed in the recesses of the first and second regulation members, respectively. In this case, an alignment between the first regulation member and the second diaphragm and another alignment between the second regulation member and the second diaphragm can be performed independently, and thus the welding work in forming the first and second welding layers of the first welding part can be easily performed.

Preferably, depths of the recesses of the first and second regulation members may be substantially equal to thicknesses of the outer edge portions of the first and second diaphragms, respectively. In this case, in a state in which the annular periphery portions of the first and second regulation members are in contact with each other, the outer edge portions of the first and second diaphragms are brought into contact with each other. This means that the motions of the first and second regulation members and the first and second diaphragms in the opposite directions can be regulated by each other. Thus, the durability of the first welding part that fix the annular periphery portions of the first and second regulation members to the outer edge portions of the first and second diaphragms is excellent.

Preferably, the first diaphragm may include a curved portion formed between the deformable portion and the outer edge portion of the first diaphragm and protruding from the annular periphery portion of the first regulation member in a direction opposite to a protruding direction of the deformable portion of the first diaphragm in a natural state of the first diaphragm. Similarly, the second diaphragm may include a curved portion formed between the deformable portion and the outer edge portion of the second diaphragm and protruding from the annular periphery portion of the second regulation member in a direction opposite to a protruding direction of the deformable portion of the second diaphragm in a natural state of the second diaphragm. In this case, in a state in which the annular periphery portions of the first and second regulation members contact each other, the curved portions of the first and second diaphragms are pressed against each other, the reaction force of the pressing force brings a state in which stress to the inner surface side of each of the annular periphery portions of the first and second regulation members acts on each of the outer edge portions of the first and second diaphragms, and thus the durability of the first welding part that fix each of the annular periphery portions of the first and second regulation members to each of the outer edge portions of the first and second diaphragms is excellent.

In order to solve the foregoing problem, a metal diaphragm damper according to the present invention comprises: a damper main body including a diaphragm and a plate-shaped base member between which a gas is sealed, the diaphragm being provided with a deformable portion at a center thereof; a regulation member that is disposed outside the deformable portion of the diaphragm; a first welding part provided with a welding layer that is formed by welding to seal an annular peripheral portion of the regulation member and an outer edge portion of the diaphragm; and a second welding part provided with a welding layer that is formed by welding to seal the annular part of the regulation member and the base member. According to this configuration of the metal diaphragm damper, the regulation member regulates the deformation of the diaphragm in the swelling direction, and thus the durability of the damper main body can be improved. The annular periphery portion of the regulation member and the outer edge portion of the diaphragm are sealed with the first welding part, and the annular periphery portion of the regulation member and the base member are sealed with the second welding part. Thus, the regions in which welding is performed are small. This means that welding of excellent accuracy can be performed, and that hermeticity is excellent.

In order to solve the foregoing problem, a method of manufacturing a metal diaphragm damper according to the present invention, the metal diaphragm damper comprising a damper main body with a disk shape including a first diaphragm and a second diaphragm between which a gas is sealed and each of which is provided with a deformable portion at a center thereof; a first regulation member disposed outside the deformable portion of the first diaphragm; and a second regulation member disposed outside the deformable portion of the second diaphragm, wherein the method comprises: a first welding step of fixing an annular periphery portion of the first regulation member to an outer edge portion of the first diaphragm by welding; a second welding step of fixing an annular part of the second regulation member to an outer edge portion of the second diaphragm by welding; and a third welding step of fixing the annular parts of the first and second regulation members by welding after the first and second steps. According to the aforesaid method, the first and second regulation members can regulate the deformation of the damper main body in the swelling direction, and the durability of the damper main body can be improved. After the annular periphery portion of the first regulation member is fixed to the outer edge portion of the first diaphragm in the first welding step and the annular periphery portion of the second regulation member is fixed to the outer edge portion of the second diaphragm in the second welding step, the annular periphery portions of the first and second regulation members are fixed to each other in the third welding step. Thus, the regions in which welding is performed are small, welding of excellent accuracy can be performed, and as a result, hermeticity is excellent.

Preferably, the first welding step and the second welding step may be performed in an atmosphere made of air, and the third welding step may be performed in an atmosphere of the gas to be sealed between the first and second diaphragms. In this case, the first welding step performed in the atmosphere made of air can suppress the occurrence of welding fumes in the second welding step, and thus the impediment to welding work due to welding fumes can be suppressed. That is, welding of excellent accuracy can be performed.

DESCRIPTION OF EMBODIMENTS

In the following, modes that carry out a metal diaphragm damper and a manufacturing method for the same according to the present invention will be described based on embodiments.

First Embodiment

Referring to FIGS. 1 to 6, a metal diaphragm damper according to a first embodiment of the present invention will be described.

Figure 1:
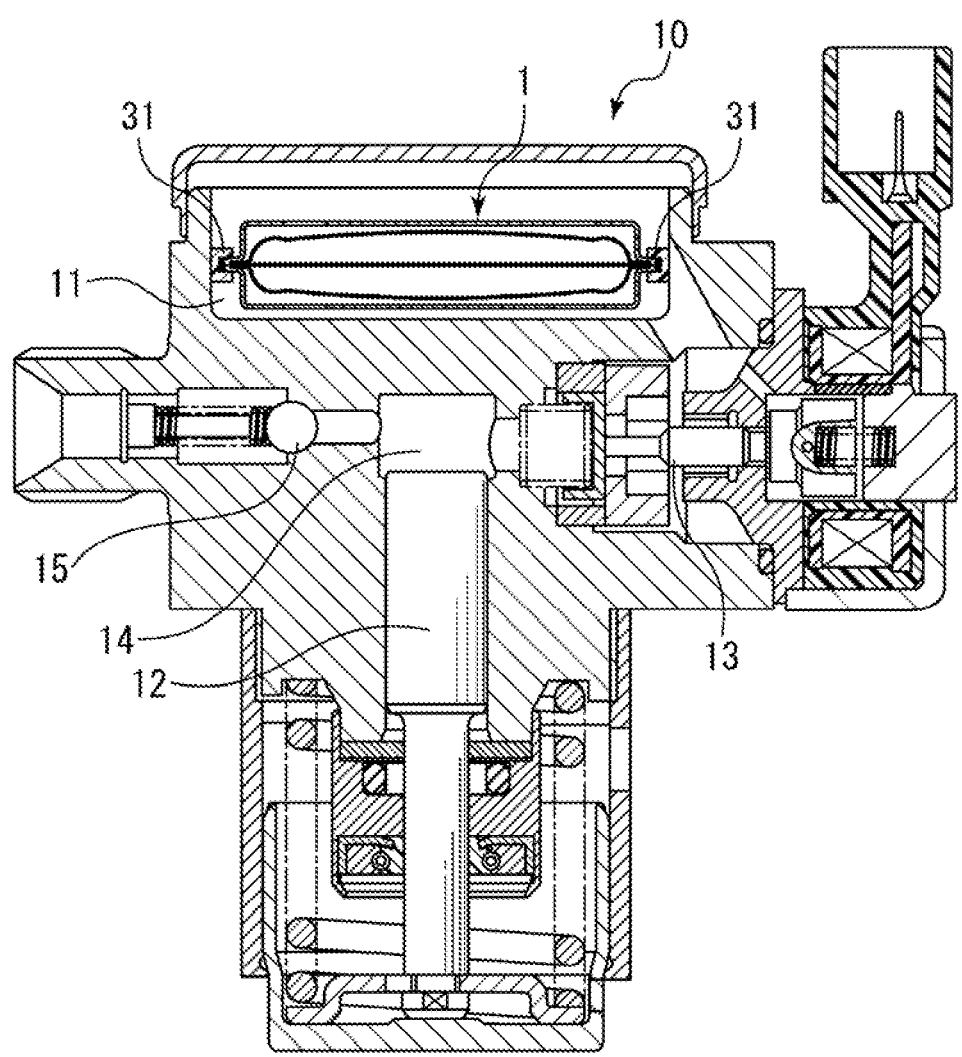
FIG. 1 is a cross-sectional view showing a high-pressure fuel pump in which a metal diaphragm damper according to a first embodiment of the present invention is installed.

As shown in FIG. 1, a metal diaphragm damper 1 according to the first embodiment of the present invention is installed in a high-pressure fuel pump 10 that compression-delivers fuel, which is supplied from a fuel tank, to the injector side through a fuel inlet, not shown. The high-pressure fuel pump 10 pressurizes and discharges fuel by the reciprocating motion of a plunger 12 driven by the rotation of the cam shaft, not shown, of an internal combustion engine.

As a mechanism of the pressurization and discharge of the fuel in the high-pressure fuel pump 10, first, a suction process is performed in which when the plunger 12 descends, a suction valve 13 is opened and fuel is sucked from a fuel chamber 11 that is formed on the fuel inlet side to a pressurizing chamber 14. Subsequently, a volume adjustment process is performed in which when the plunger 12 ascends, a part of the fuel in the pressurizing chamber 14 is returned to the fuel chamber 11, and after the suction valve 13 is closed, a pressurizing process is performed in which when the plunger 12 further ascends, the fuel is pressurized.

As described above, the high-pressure fuel pump 10 repeats a cycle of the suction process, the volume adjustment process, and the pressurizing process, and the high-pressure fuel pump 10 pressurizes fuel, opens a discharge valve 15, and discharges the fuel to the injector side. At this time, pulsation that repeats a high pressure and a low pressure is produced in the fuel chamber 11. The metal diaphragm damper 1 is used for reducing pulsation produced in the fuel chamber 11 of the high-pressure fuel pump 10 described above.

Figure 2:
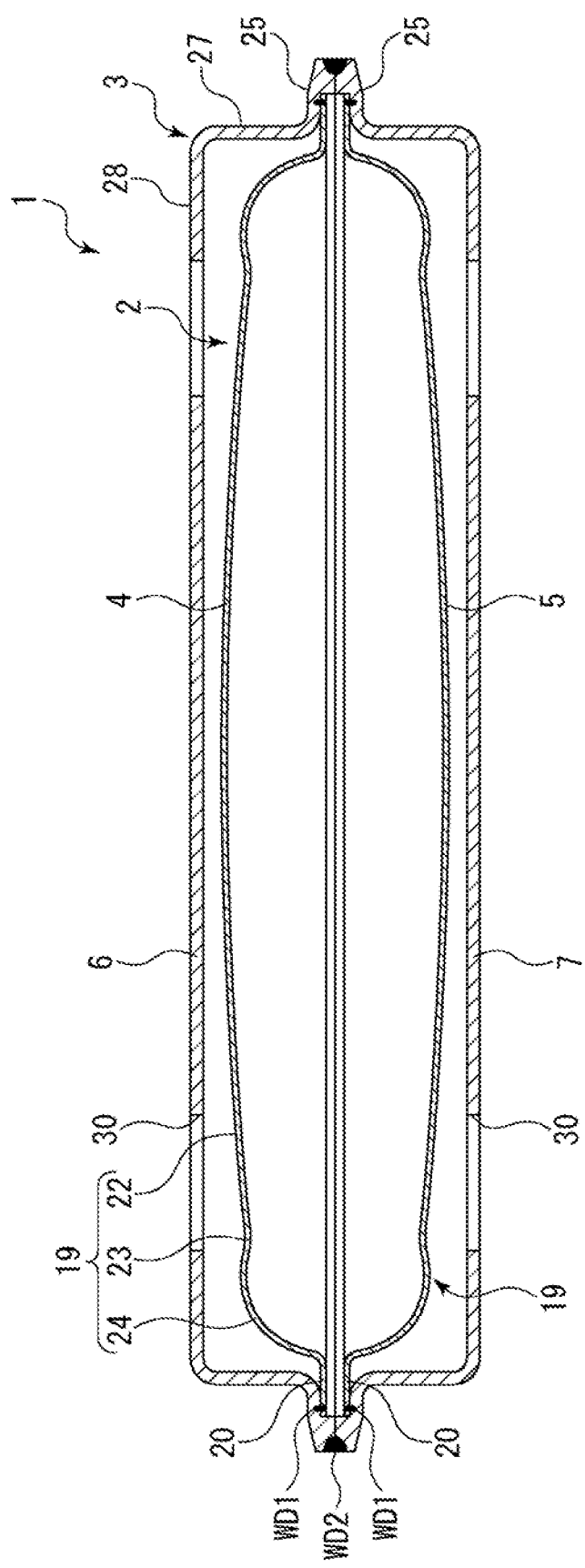
FIG. 2 is a cross-sectional view showing the metal diaphragm damper according to the first embodiment.

As shown in FIG. 2, the metal diaphragm damper 1 includes a damper main body 2 composed of a diaphragm 4 and a diaphragm 5 and a cover member 3 composed of a regulation member 6 and a regulation member 7 individually disposed on the radially outward sides of the diaphragms 4 and 5.

The diaphragms 4 and 5 are formed in a dish shape with a uniform thickness overall in almost the same shape by press working of a metallic plate of the same metal. On the center sides in the radial direction, i.e., at the centers of the diaphragms 4 and 5, deformable portions 19 are formed, respectively. On the radially outward side of the deformable portions 19, outer edge portions 20 with a flat annular shape are formed extending from the deformable portions 19 in an outer radial direction, respectively.

Next, the diaphragm 4 and the diaphragm 5 will be described. Note that since the diaphragm 4 and the diaphragm 5 are in the same shape, here, the one diaphragm 4 will be described, and the description of the other diaphragm 5 is omitted.

The deformable portion 19 of the diaphragm 4 is mainly composed of a third curved portion 24 that is continuously connected to the radially inner side part of the outer edge portion 20, a first curved portion 22 on the center side (i.e., on the radially inner side), and a second curved portion 23 that is located between the third curved portion 24 and the first curved portion 22.

The first curved portion 22, the second curved portion 23, and the third curved portion 24 are each formed at a certain curvature. The first curved portion 22 is formed protruding to the outside of the diaphragm 4 (i.e., to the side of the regulation member 6 in FIG. 2), the second curved portion 23 is formed protruding to the inside of the diaphragm 4, and the third curved portion 24 is formed protruding to the outside of the diaphragm 4.

Next, the regulation member 6 and the regulation member 7 will be described. Note that since the regulation member 6 and the regulation member 7 are in the same shape, here, one regulation member 6 will be described, and the description of the other regulation member 7 is omitted.

Figure 3:
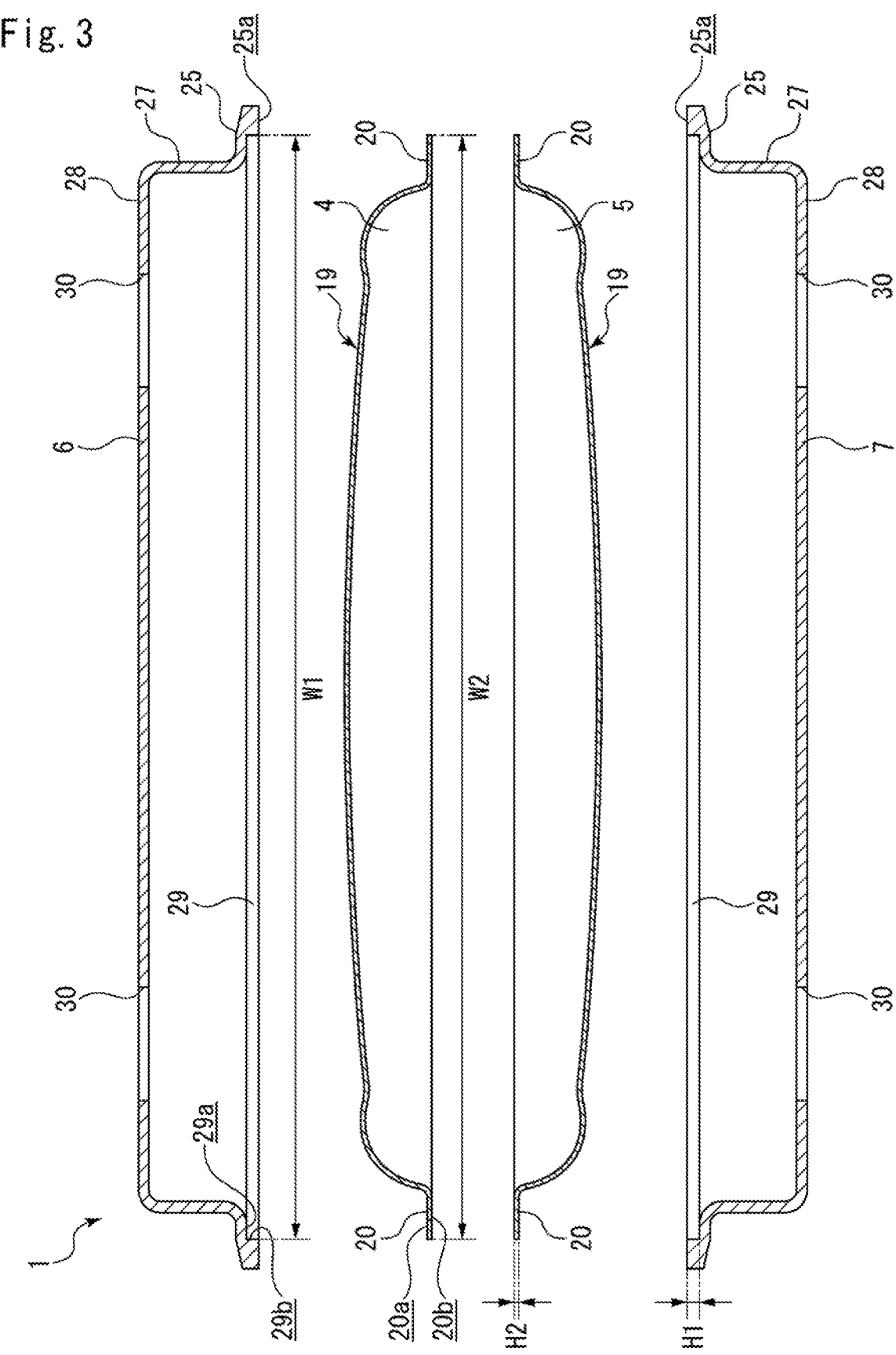
FIG. 3 is an exploded cross-sectional view showing the metal diaphragm damper according to the first embodiment.
Figure 4:
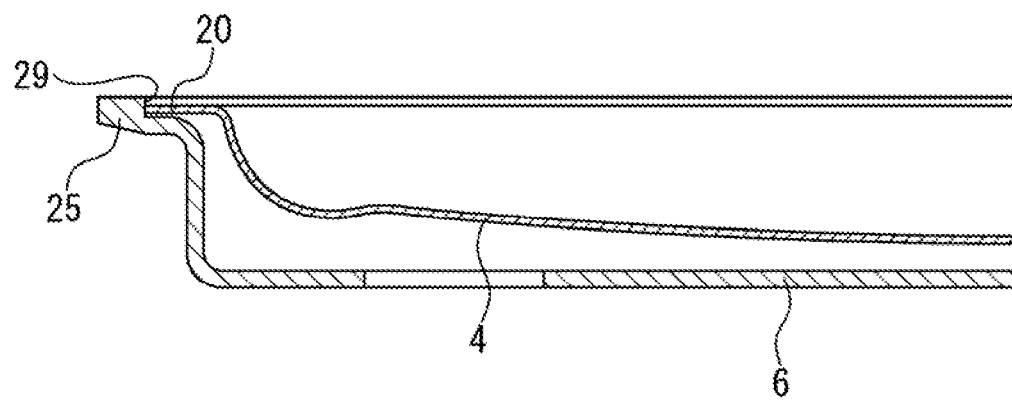
FIG. 4A is an exploded cross-sectional view showing a state in which one diaphragm is laid on one regulation member in the first embodiment.
FIG. 4B is an exploded cross-sectional view showing a state in which the fixing of the diaphragm to the regulation member by welding is completed in the first embodiment.
Figure 4:
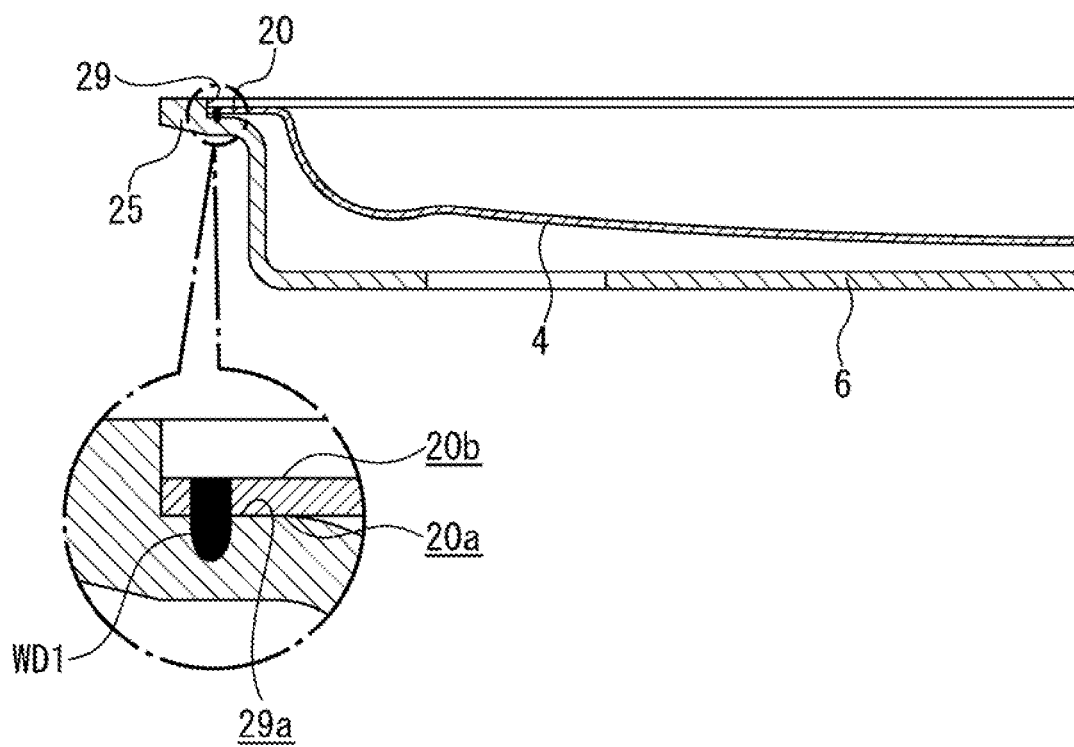

As shown in FIG. 3, the regulation member 6 includes an annular periphery portion 25 having a diameter larger than the outer diameter of the diaphragm 4, and a side wall portion 27 and a bottom portion 28 that is continuously connected to the radially inner side part of the annular periphery portion 25. The side wall portion 27 and the bottom portion 28 form a bottomed cylindrical shape, and thus the regulation member 6 is formed in a nearly hat shape viewed in a cross section. As shown in FIG. 2, the bottom portion 28 is disposed apart at a predetermined distance from the deformable portion 19 of the diaphragm 4. Thus, in the case in which the deformable portion 19 of the diaphragm 4 is deformed in the swelling direction by a predetermined amount, the deformable portion 19 contacts the bottom portion 28 of the regulation member 6 to regulate the deformation of the diaphragm 4. That is, the permissible deformation amount of the diaphragm 4 in the swelling direction can be set by adjusting the distance between the deformable portion 19 and the bottom portion 28.

The annular periphery portion 25 of the regulation member 6 has a flat annular shape opposite in parallel with an annular periphery portion 25 of the regulation member 7. The annular periphery portion 25 has an inner surface 25a facing to the annular part 25 of the regulation member 7 and is provided with a recess 29 formed in the inner surface 25a so as to continuously run in the circumferential direction. The recess 29 is formed such that the recess 29 is recessed in the thickness direction of the annular periphery portion 25 and opened at the radially inner side of the annular periphery portion 25.

On the bottom portion 28 of a cover member 3 constituted by the regulation members 6 and 7, a plurality of holes 30 is formed, and the outer side of the cover member 3 communicates with the inner side through these holes 30.

As shown in FIG. 1, a plurality of support members 31 is fixed to the inner wall of the fuel chamber 11. The support member 31 has an almost U-shape viewed in a cross section, and has an opening 31a (see FIG. 6) directed in the inner radial direction of the fuel chamber 11. The annular periphery portion 25 of the regulation member 6 and the annular periphery portion 25 of the regulation member 7 that constitute the cover member 3 are fit into the opening 31a, and as a result the cover member 3 is supported in the fuel chamber 11.

Next, the manufacturing process of the metal diaphragm damper 1 will be described. As shown in FIG. 4A, first, the outer edge portion 20 of the diaphragm 4 is disposed in the recess 29 of the annular periphery portion 25 of the regulation member 6. Subsequently, as shown in FIG. 4B, in an atmosphere made of air, in a state in which a bottom surface 29a of the recess 29 (see FIG. 3) and an outer surface 20a of the outer edge portion 20 of the diaphragm 4 (see FIG. 3) are brought into surface contact with each other, the components are fixed to each other by welding throughout the circumference (referred to as a first welding step).

In the present embodiment, laser welding is used for the first welding step. In detail, a laser beam is applied from the inside of the outer edge portion 20 to an inner surface 20b of the outer edge portion 20 of the diaphragm 4, the boundary part of the bottom surface 29a in the recess 29 of the regulation member 6 and the bottom surface 20a at the outer edge portion 20 of the diaphragm 4 is melted so that a welding layer (i.e., first half the first welding part) WD1 is formed to penetrate the outer edge portion 20 of the diaphragm 4 and sink into the annular periphery portion 25 of the regulation member 6 (see FIG. 4B). Note that the welding step is not limited to laser welding, and the welding step may be performed by welding means, including gas welding, arc welding, friction stir welding and so on. However, laser welding has a characteristic that there is less welding deformation on the inner surface 20b of the outer edge portion 20 of the diaphragm 4.

As shown in FIG. 3, a diameter W1 defined by the inner side surface 29b, on the outer diameter side, of the recess 29 of the annular periphery portion 25 of the regulation member 6 is substantially equal to an outer diameter W2 of the outer edge portion 20 of the diaphragm 4, and accordingly the motion of the diaphragm 4 in the radial direction in the recess 29 of the regulation member 6 can be regulated. Thus, in performing the first welding step, the diaphragm 4 is rightly positioned with respect to the regulation member 6, and excellent welding workability can be provided.

Similarly, in the atmosphere made of air, in the state in which the bottom surface 29a of the recess 29 of the annular periphery portion 25 of the other regulation member 7 and the outer surface 20a of the outer edge portion 20 of the other diaphragm 5 are brought inti surface contact with each other, these components are fixed by welding throughout the circumference, and another welding layer WD1 is formed at the boundary portions between the annular periphery portion 25 of the regulation member 7 and the outer edge portion 20 of the diaphragm 5 (referred to as a second welding step).

Figure 5:
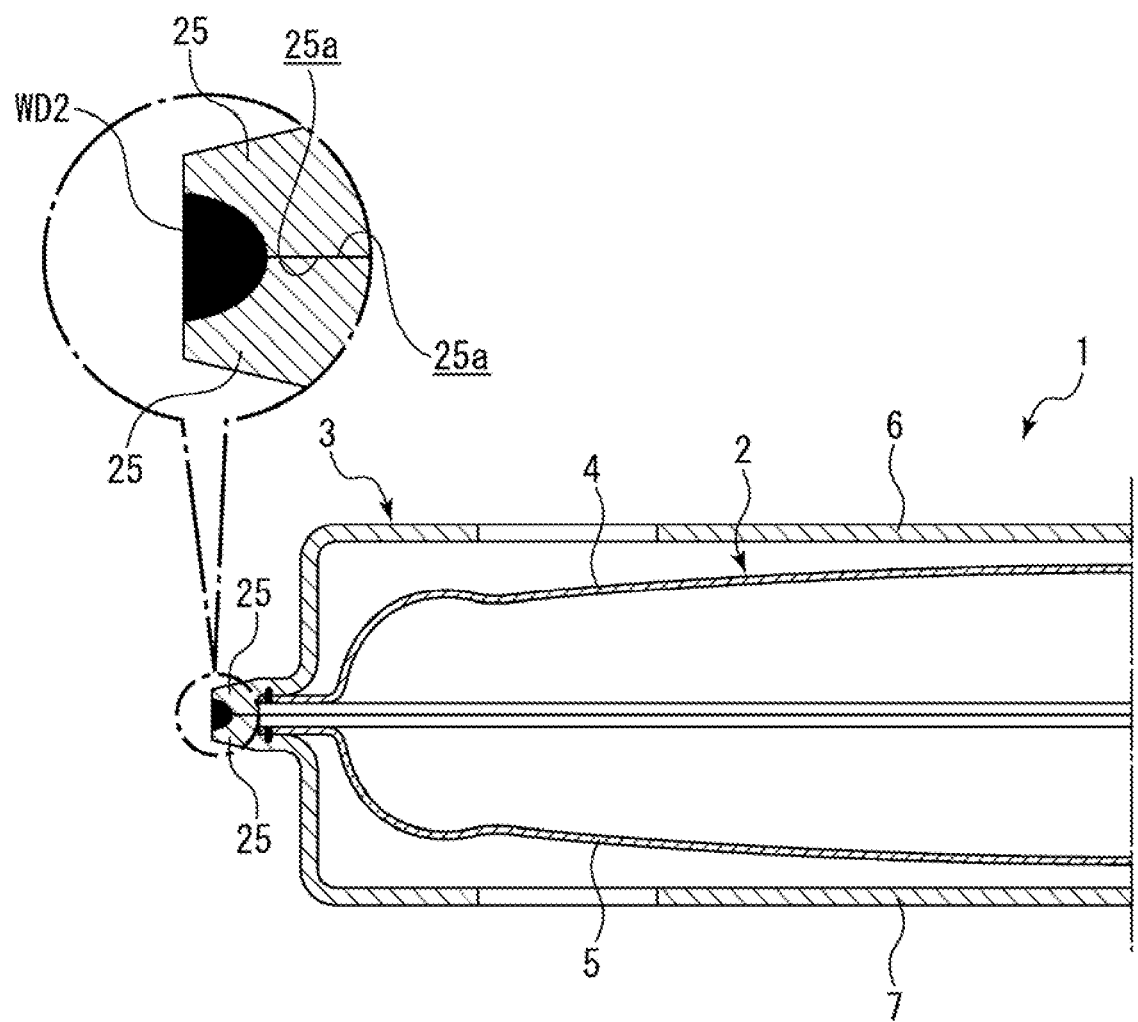
FIG. 5 is an exploded cross-sectional view showing a state in which the fixing of the regulation members to each other is completed in the first embodiment.

Next, in the atmosphere made of a gas at a predetermined pressure that is sealed between the diaphragms 4 and 5, the regulation member 6 and the regulation member 7 that have been fixed to the diaphragms 4 and 5 are laid on each other in symmetry, specifically in a state in which the opposite surface 25a of the annular part 25 of the regulation member 6 and the opposite surface 25a of the annular part 25 of the regulation member 7 are in surface contact, the components are fixed and welded throughout the circumference (referred to as a third welding step), and a welding layer (i.e., a second welding part) WD2 is formed at the outermost circumferential boundary portions between the inner surface 25a of the regulation member 6 and the inner surface 25a of the regulation member 7 (see FIG. 5).

By welding the annular periphery portion 25 of the regulation member 6 to the annular periphery portion 25 of the regulation member 7, the assembly of the cover member 3 is completed as well as the assembly of the damper main body 2 is completed.

The outer edge portion 20 of the diaphragm 4 and the annular periphery portion 25 of the one regulation member 6 are fixed to each other throughout the circumference with the first welding layer WD1 and hermetically sealed in the first welding step, similarly, the outer edge portion 20 of the other diaphragm 5 and the annular periphery portion 25 of the other regulation member 7 are fixed to each other throughout the circumference with the second welding layer WD1 and hermetically sealed in the second welding step, the annular periphery portion 25 of the regulation member 6 and the annular periphery portion 25 of the regulation member 7 are fixed to each other in the third welding step. As a result, the fixing of the diaphragm 4 to the diaphragm 5 are completed throughout the circumference with the welding layer WD2 and hermetically sealed, and thus the hermeticity of the damper main body 2 is secured.

In the enclosed space inside the damper main body 2, a gas made up of, e.g., argon or helium at a predetermined pressure is sealed. Note that the damper main body 2 adjusts the amount of volumetric change by the internal pressure of the gas sealed in the inside and thus a desired pulsation absorption performance can be obtained.

In the cover member 3, since the plurality of holes 30 is formed on the bottom part 28 of the regulation member 6 and the bottom part 28 of the regulation member 7, the outer side of the cover member 3, i.e., the internal space of the fuel chamber 11 are communicated with the inner side of the cover member 3, i.e., the space around the damper main body 2 through the plurality of holes 30. Thus, the fuel pressure associated with pulsation that is introduced into the fuel chamber 11 and repeats a high pressure and a low pressure directly acts on the damper main body 2.

Next, the pulsation absorption of the metal diaphragm damper 1 when receiving the fuel pressure associated with pulsation that repeats a high pressure and a low pressure will be described with reference to FIG. 6.

Figure 6:
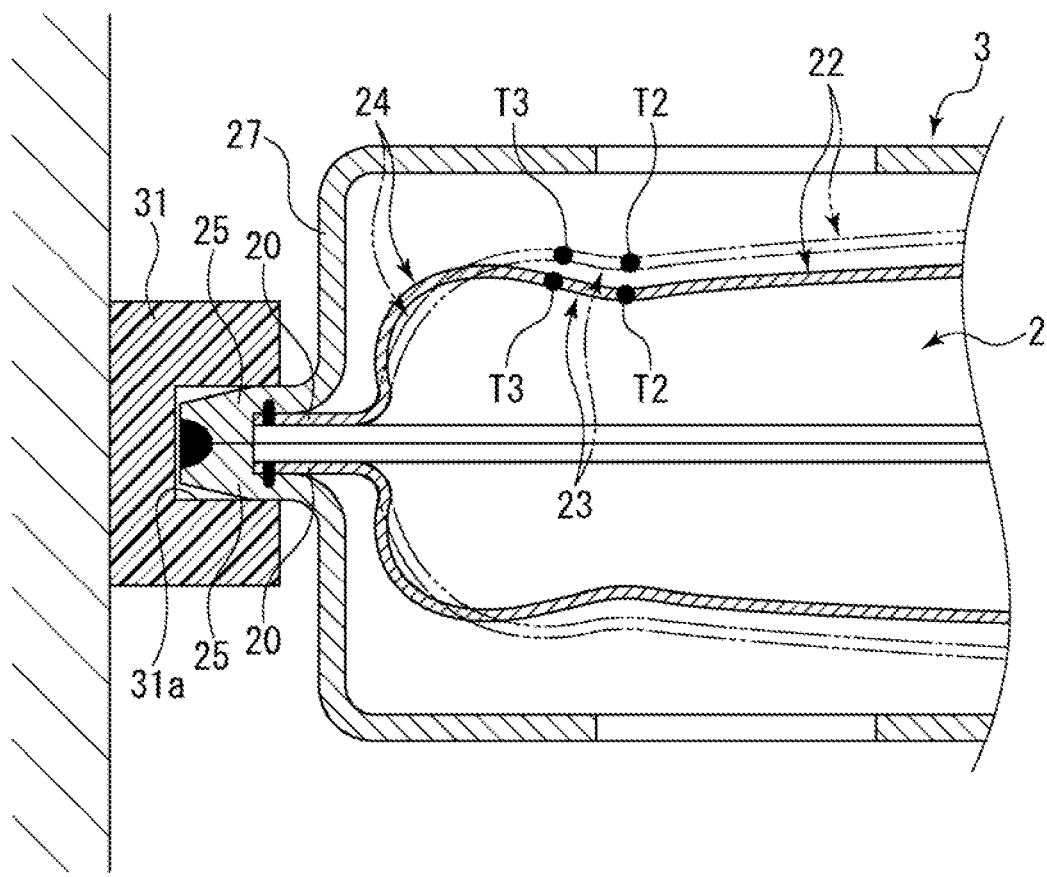
FIG. 6 is a partially enlarged cross-sectional view showing the structure of the diaphragms at a high pressure depicted by solid lines and at a low pressure depicted by broken lines, in the first embodiment.

As shown in FIG. 6, the fuel pressure associated with pulsation is changed from a low pressure to a high pressure and a fuel pressure in the fuel chamber 11 is applied to the diaphragm 4, first, the first curved portion 22 in a dome shape with a large curvature radius and a small stiffness is mainly deformed. Note that the first curved portion 22 is flattened to the inner side, and the gas in the damper main body 2 is compressed.

In detail, the first curved portion 22 is deformed in the direction to the inside of the diaphragm 4 due to the fuel pressure that is an external pressure and deformed so as to expand in the outer radial direction, and stress is applied to the parts on the outer diameter side from the first curved portion 22 of the diaphragm 4 in the outer radial direction.

The stress in the outer radial direction applied to the outer diameter side of the diaphragm 4 is transmitted along the surface of the diaphragm 4. Since the second curved portion 23 is a curved surface recessed in the inward direction, on the radially inner side from a bottom point T2 of the second curved portion 23 in the axial direction, the stress follows the shape of the second curved portion 23, and also acts in the direction to the inside of the diaphragm 4. Thus, as shown in FIG. 6, due to the force applied in the direction to the inside and the stress in the outer radial direction, the second curved portion 23 is deformed such that the bottom point T2 in the axial direction moves in the direction to the inside of the diaphragm 4 and in the outer radial direction.

As described above, the second curved portion 23 is deformed such that its bottom point T2 moves in the direction to the inside of the diaphragm 4 and in the outer radial direction, and on the third curved portion 24 that runs to the second curved portion 23, force that pulls the third curved portion 24 in the direction to the inside of the diaphragm 4 also acts on the third curved portion 24 on the radially inner side from its top point T3, in addition to the stress in the outer radial direction. Thus, the third curved portion 24 is deformed such that the curvature radius is smaller than at a low pressure, and the third curved portion 24 is deformed so as to protrude on the outer diameter side.

Accordingly, the stress in the outer radial direction that acts on the first curved portion 22 is converted into the force that reduces the curvature radius of the third curved portion 24, a part of the stress in the outer radial direction is absorbed by the deformation of the third curved portion 24, and thus the stress applied to the diaphragm 4 is dispersed, and thus the diaphragm 4 is prevented from being fractured. The third curved portion 24 of the diaphragm 4 is apart from the side wall portion 27 of the regulation member 6, and the side wall portion 27 of the regulation member 6 does not hamper the deformation of the third curved portion 24 in the outer radial direction due to a fuel pressure.

As described above, since the diaphragm 4 is configured in which a part of the stress in the outer radial direction can be absorbed by the deformation of the third curved portion 24, the annular part 25 of the regulation member 6 is located the outer side of the outer edge portion 20 of the diaphragm 4, and the stress applied to the diaphragm 4 can be dispersed in the outer radial direction while the deformation of the outer edge portion 20 in the outer radial direction is regulated.

As described above, for securing the hermeticity of the damper main body 2, in the metal diaphragm damper 1 according to the present embodiment, since the annular periphery portions 25 of the regulation member 6 and the regulation member 7 which have been fixed to the outer edge portions 20 of the diaphragms 4 and 5, respectively, have only to be welded to each other, the region in which the welding layer WD2 formed by welding is formed is relatively small, and welding work is easy. In addition to this, since variation hardly occurs in the depth of penetration in welding, hermeticity can be reliably secured.

Since the outer diameter of the annular periphery portions 25 of the regulation members 6 and 7 is formed larger than the outer diameter W2 of the diaphragms 4 and 5, in sealing the damper main body 2, the two annular periphery portions 25 of the regulation members 6 and 7 have only to be welded to each other. Since the outer edge portions 20 of the two diaphragms 4 and 5 do not interfere, the annular periphery portions 25 of the regulation members 6 and 7 can be highly accurately welded to each other, and the region in which welding is performed can be reduced.

As shown in FIG. 3, since a depth H1 in the axial direction of the recess 29 of the annular part 25 of the regulation member 7 is formed slightly larger than a thickness H2 in the axial direction of the outer edge portion 20 of the diaphragm 5 (i.e., H1>H2), even in the case in which, for example, irregularities are produced on the inner surface 20b of the outer edge portion 20 of the diaphragm 5 due to welding in the first welding step, the irregular parts hardly protrude from the recess 29. Thus, the inner surfaces 20b of the outer edge portions 20 of the diaphragm 4 and the diaphragm 5 can be prevented from contacting each other, the inner surface 25a of the annular periphery portion 25 of the regulation member 6 and the inner surface 25a of the annular periphery portion 25 of the regulation member 7 can be securely brought into surface contact with each other throughout the circumference. When the inner surfaces 25a are in surface contact, the welding work is easy in the third welding step, and strength of the metal diaphragm damper 1 can be improved against stress in a torsion direction (i.e., circumferential direction) acting on the welding part of the annular periphery portion 25 of the regulation member 6 and the annular periphery portion 25 of the regulation member 7.

Since the outer diameter W1 of the recess 29 defined by the inner side surface 29b, on the radially outward side, of the recess 29 of the annular periphery portion 25 of the regulation member 6 has a diameter almost the same as the outer diameter W2 of the outer edge portion 20 of the diaphragm 4 (i.e., W1=W2), force that is to deform the diaphragm 4 such that the diaphragm 4 expands in the outer radial direction due to a fuel pressure can be received on the inner side surface 29b, on the radially outward side, of the recess 29 of the annular part 25 of the regulation member 6. Accordingly, the concentration of stress on the welding layer WD1 that is a welding place of the regulation member 6 to the diaphragm 4 can be prevented, and the welding strength of the first welding layer WD1 can be maintained.

Additionally, as shown in FIG. 6, the annular periphery portion 25 of the regulation member 6 and the annular periphery portion 25 of the regulation member 7 of the cover member 3 are fit into the opening 31a of the support member 31, and the motion in the direction in which the annular periphery portion 25 of the regulation member 6 is apart from the annular periphery portion 25 of the regulation member 7 can be regulated. Thus, the welding strength of the welding layer WD2 that is a welding place of the annular periphery portion 25 of the regulation member 6 to the annular periphery portion 25 of the regulation member 7 can be maintained.

In order to inject the gas into the inside of the damper main body 2, the third welding step in which the annular periphery portion 25 of the regulation member 6 is welded to the annular periphery portion 25 of the regulation member 7 is performed in the atmosphere made of the gas. In detail, in a small room (or chamber) for welding work filled with a gas a predetermined pressure, the third welding step is performed. At this time, a conventional metal diaphragm damper 1 has a problem that since four plate bodies, which are the outer edge portions of two diaphragms, the annular periphery portion of an upper support member, and the annular periphery portion of a lower support member, are simultaneously fixed and welded, the amount of molten metal necessary for welding is increased, and welding fumes produced in welding are increased. An increase in the welding fumes has a problem that in the case in which laser welding is used, welding fumes hamper a beam and welding accuracy is degraded, and in addition to this, there is a risk that arises problems, such as degradation in productivity due to the necessity of frequent cleaning of the inside of a room for welding work.

In comparison with such a conventional metal diaphragm damper, the metal diaphragm damper 1 according to the present embodiment can provide advantages that the occurrence of welding fumes can be suppressed, that the impediment to a beam can be suppressed in laser welding, and that the number of cleaning of the inside of a small room for welding work can be reduced. The advantages result from the fact that in the atmosphere of a gas that is sealed in the damper main body 2, two parts, which are the annular periphery portion 25 of the regulation member 6 and the annular periphery portion 25 of the regulation member 7, have only to be fixed by welding (i.e., the third welding step), Additionally, since the fixing of the regulation member 6 to the diaphragm 4 by welding (i.e., the first welding step) and the fixing of the regulation member 7 to the diaphragm 5 by welding (i.e., the second welding step) are completed in the atmosphere made of air in advance, the advantages described above are more noticeable.

Since the annular periphery portion 25 of the regulation member 6 and the annular periphery portion 25 of the regulation member 7 have distal ends on the outer diameter side formed in a thin thickness, the region in which welding is performed is small, and the welding layer WD2 of excellent accuracy can be easily formed. Moreover, since the outer edge portion of the cover member 3 formed by the annular periphery portion 25 of the regulation member 6 and the annular periphery portion 25 of the regulation member 7 has a tapered shape so as to become thinner toward the tip thereof, the boundary part of the annular periphery portion 25 of the regulation member 6 and the annular periphery portion 25 of the regulation member 7, i.e., portions at which the welding layer WD2 is formed is easily distinguished, and working efficiency in the third welding step is excellent.

Second Embodiment

Next, a metal diaphragm damper according to a second embodiment of the present invention will be described with reference to FIGS. 7A and 7B. Note that the description of duplicated components in the same configuration as the components in the embodiment is omitted.

Figure 7:
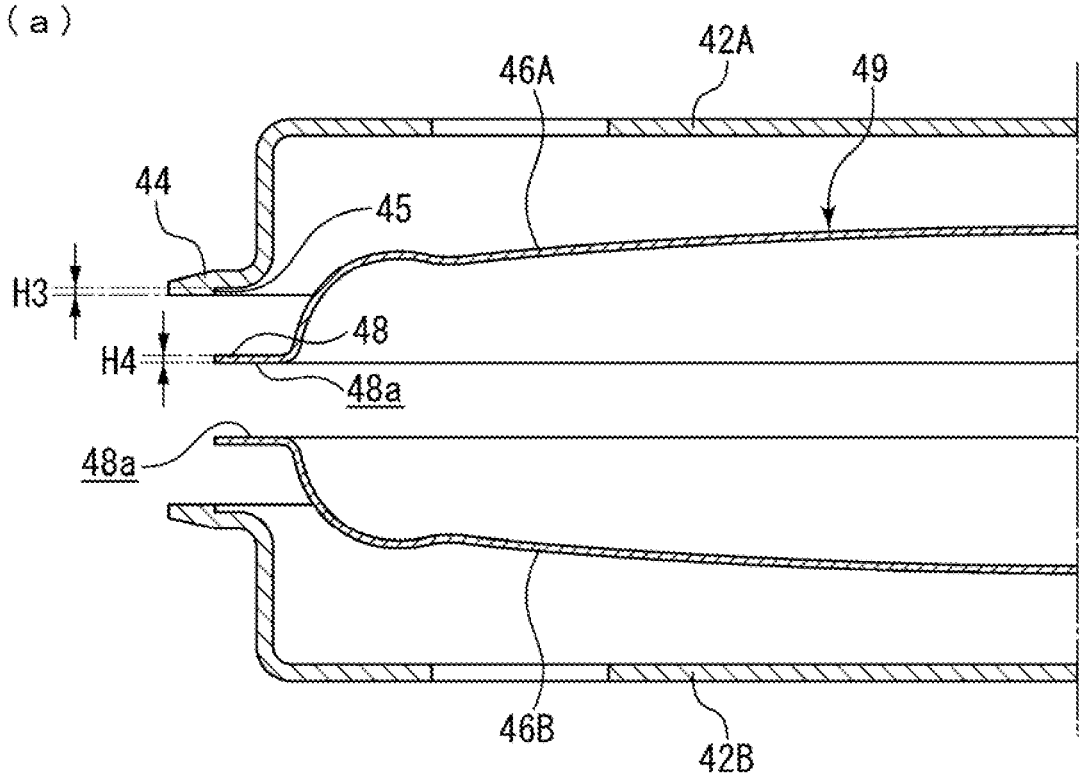
FIG. 7A is a cross-sectional view showing a metal diaphragm damper according to a second embodiment of the present invention before assembly.
FIG. 7B is a cross-sectional view showing the metal diaphragm damper according to the second embodiment after assembly.
Figure 7:
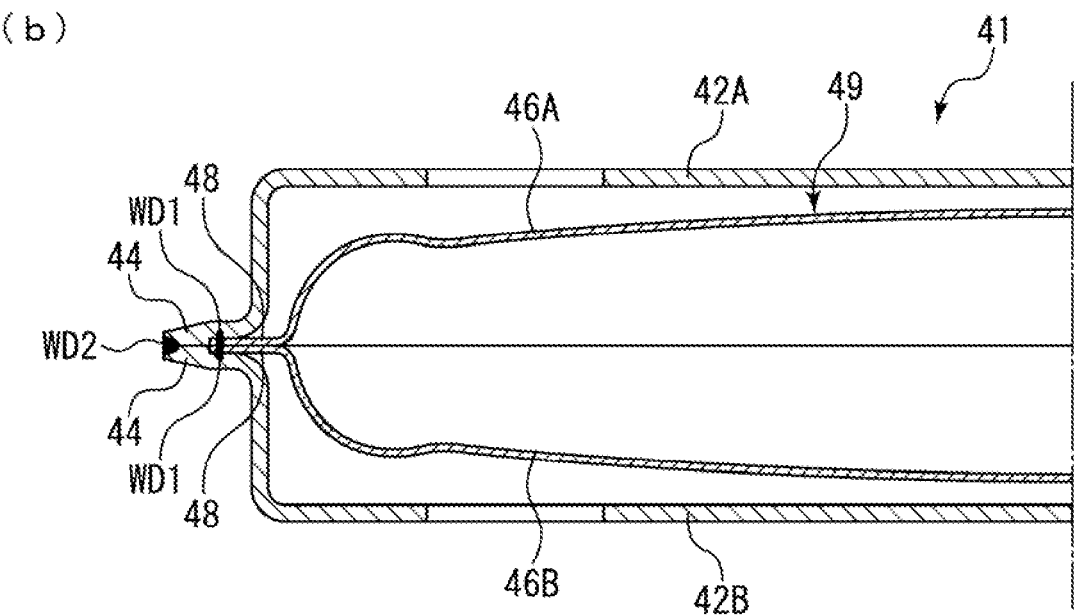

As shown in FIGS. 7A and 7B, in a metal diaphragm damper 41, a depth H3 in the thickness direction of a recess 45 of an annular part 44 of a regulation member 42A is formed almost in the same size as a thickness H4 of an outer edge portion 48 of a diaphragm 46A (H3=H4).

Thus, in the state in which the annular periphery portion 44 of the regulation member 42A is fixed by welding to an annular periphery portion 44 of the regulation member 42B, an inner surface 48a of the outer edge portion 48 of the diaphragm 46A and an inner surface 48a of an outer edge portion 48 of a diaphragm 46B are bought into surface contact with each other throughout the circumference. According to this, since the inner surfaces 48a of the outer edge portions 48 of the two diaphragms 46A and 46B contacts each other and regulate each other's motions in the opposite directions, the durability of first and second welding layers WD1 (see FIG. 4B) that fix, by welding, the annular periphery portion 44 of the regulation member 42A to the outer edge portion 48 of the diaphragm 46A and the annular periphery portion 44 of the regulation member 42B to the outer edge portion 48 of the diaphragm 46B is excellent.

Note that since welding deformation in the opposite surfaces 48a of the outer edge portions 48 of the diaphragms 46A and 46B can be suppressed using laser welding for the first welding step, the opposite surface 48a of the outer edge portion 48 of the diaphragm 46A and the opposite surface 48a of the outer edge portion 48 of the diaphragm 46B can be in surface contact throughout the circumference only through surface treatment, such as simple polishing.

Third Embodiment

Next, a metal diaphragm damper according to a third embodiment of the present invention will be described with reference to FIGS. 8A and 8B. Note that the description of duplicated components in the same configuration as the components in the embodiment is omitted.

Figure 8:
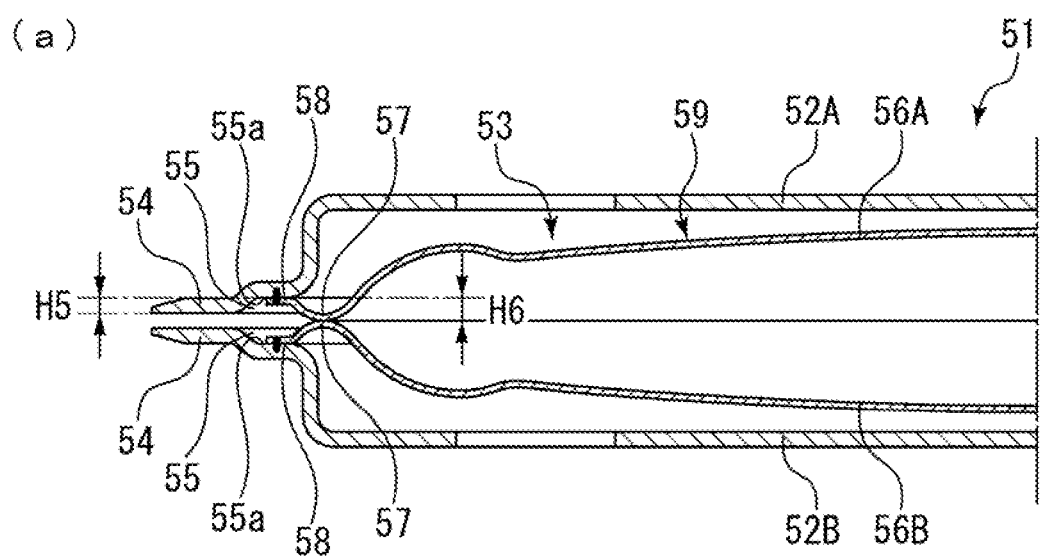
FIG. 8A is a cross-sectional view showing a metal diaphragm damper according to a third embodiment on the way of assembly.
FIG. 8B is a cross-sectional view showing the metal diaphragm damper according to the third embodiment after assembly.
Figure 8:
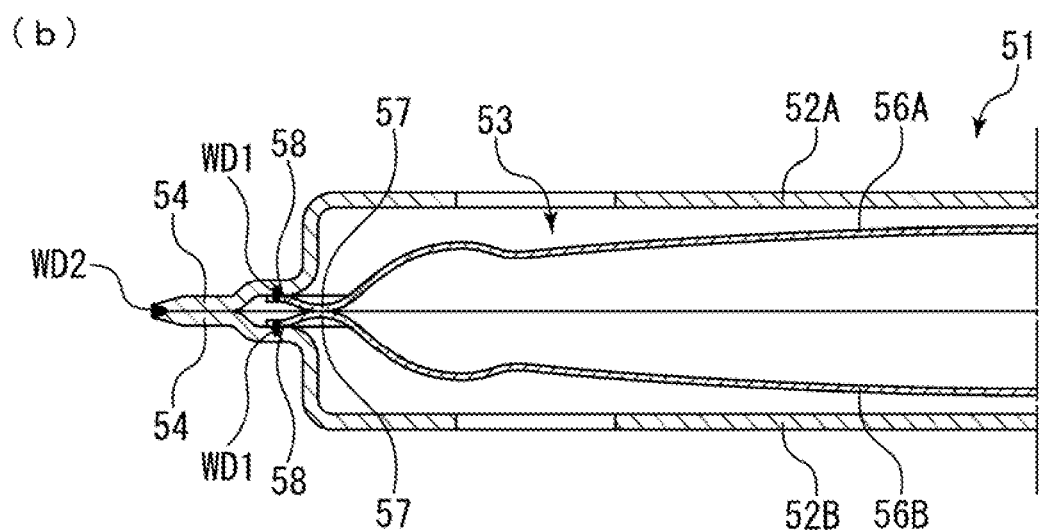

As shown in FIG. 8A, a diaphragm 56A that partially constitutes a metal diaphragm damper 51 includes a curved portion 57 between a deformable portion 59 and an outer edge portion 58, the curved portion 57 protruding from the annular periphery portion 54 of the regulation member 52A in a direction opposite to the protruding direction of the deformable portion 59 of the diaphragm 56A in a natural state of the diaphragm 56A.

A recess 55 formed on the annular periphery portion 54 of the regulation member 52A has a depth H5 in the axial direction smaller than a distance H6 from the outer edge portion 58 of the diaphragm 56A to the bottom point, i.e., lowermost point, of the curved portion 57 in the axial direction (i.e., H5<H6). Thus, as shown in FIG. 8B, in a state in which the annular periphery portion 54 of the regulation member 52A contacts an annular periphery portion 54 of a regulation member 52B, the curved portion 57 of the diaphragm 56A and a curved portion 57 of a diaphragm 56B are pressed against each other and compressed.

According to this, the curved portions 57 of the diaphragms 56A and 56B are pressed against each other, and the reaction force of the pressing force brings a state in which on the outer edge portion 58 of the diaphragms 56A and an outer edge portion 58 of the diaphragm 56B, stress to a bottom surface 55a of the recess 55 of the annular periphery portion 54 of the regulation member 52A and stress to the bottom surface 55a side of a recess 55 of the annular periphery portion 54 of the regulation member 52B act. The durability of first and second welding layers WD1 (see FIG. 4B) which are a welding place of the outer edge portions 58 of the diaphragms 56A and 56B to the annular periphery portion 54 of the regulation member 52A and a welding place of the outer edge portion 58 of the diaphragm 56B to the annular periphery portion 54 of the regulation member 52B can be maintained. Note that the depth H5 in the axial direction of the recess 55 of the annular part 54 of the regulation member 52A is formed slightly larger than the thickness in the axial direction of the outer edge portion 58 of the diaphragm 56A.

Fourth Embodiment

Next, a metal diaphragm damper according to a fourth embodiment of the present invention will be described with reference to FIGS. 9A and 9B. Note that the description of duplicated components in the same configuration as the components in the embodiment is omitted.

Figure 9:
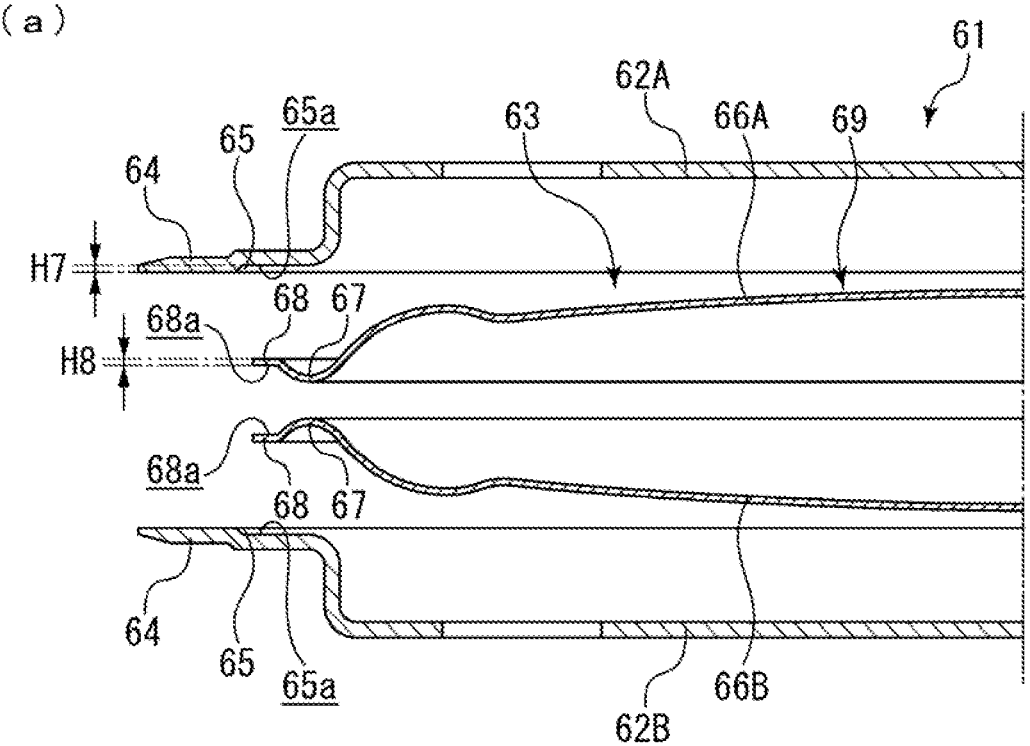
FIG. 9A is a cross-sectional view showing a metal diaphragm damper according to a fourth embodiment before assembly.
FIG. 9B is a cross-sectional view showing the metal diaphragm damper according to the fourth embodiment after assembly.
Figure 9:
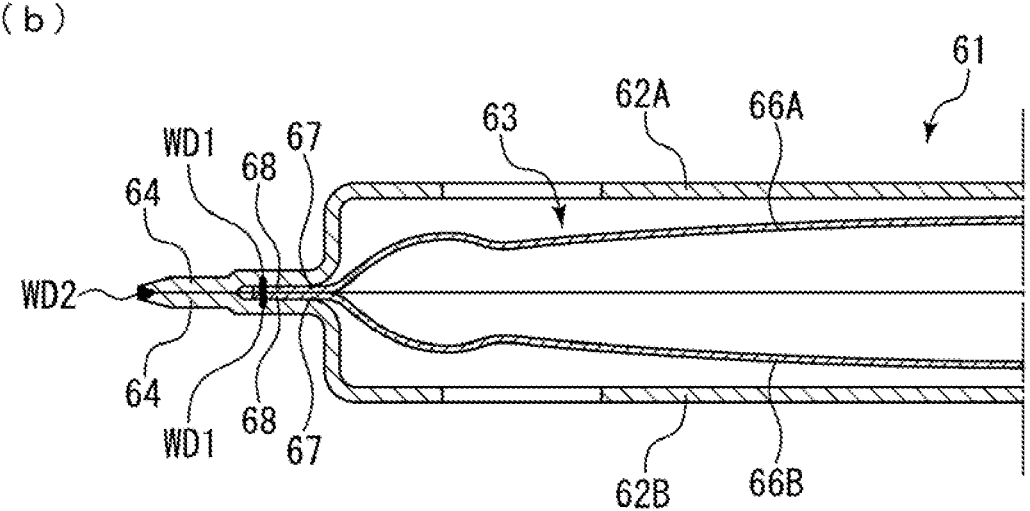

As shown in FIG. 9A, a diaphragm 66A and a diaphragm 66B that partially constitute a metal diaphragm damper 61 each include a curved portion 67 between a deformable portion 69 and an outer edge portion 68, similarly to the third embodiment the curved portion 67 protruding on the inner side in the axial direction of the outer edge portion 68 in a natural state. A depth H7 in the axial direction of a recess 65 formed on an annular periphery portion 64 of a regulation member 62A is almost in the same size as a thickness H8 of the outer edge portion 68 of the diaphragm 66A (i.e., H7=H8).

According to the aforesaid configuration, as shown in FIG. 9B, in the state in which the annular periphery portion 64 of the regulation member 62A contacts an annular periphery portion 64 of a regulation member 62B, the curved portions 67 of the diaphragms 66A and 66B are pressed against each other and compressed in a flat shape. As a result of the fact that the curved portions 67 of the diaphragms 66A and 66B are pressed against each other, the reaction force of the pressing force brings a state in which to the outer edge portions 68 of the diaphragms 66A and 66B, stress to a bottom surface 65a of the recess 65 of the annular periphery portion 64 of the regulation member 62A and stress to the bottom surface 65a side of the recess 65 of an annular periphery portion 64 of a regulation member 62B act. On the outer diameter side of the curved portions 67, inner surfaces 68a of the outer edge portions 68 are in surface contact with each other, and regulate each other's motion in the opposite directions. Thus, the durability of first and second welding layers WD1 (see FIG. 4B) can be effectively maintained.

As described above, the embodiments according to the present invention are described with reference to the drawings. The specific configurations are not limited to these embodiments, and even though modifications and additions are made within the scope of the present invention, these modifications and additions are included in the present invention.

For example, in the embodiments, the first and second welding layers WD1 are formed by laser welding such that parts of the outer edge portions 20 of the diaphragms 4 and 5 and parts of the annular periphery portions 25 of the regulation members 6 and 7 are melted and mixed, respectively. Similarly, the welding layer WD2 is formed by laser welding such that parts of the annular periphery portions 25 of the regulation members 6 and 7 are melted and mixed. However, not limited to these, the first and second welding layers WD1 and the welding layer WD2 may be formed such that a filler metal and part of the diaphragm, part of the regulation member or another filler metal.

The diaphragms 4 and 5 are not necessarily in the same shape. Similarly, the regulation members 6 and 7 are not necessarily in the same shape.

Figure 10:
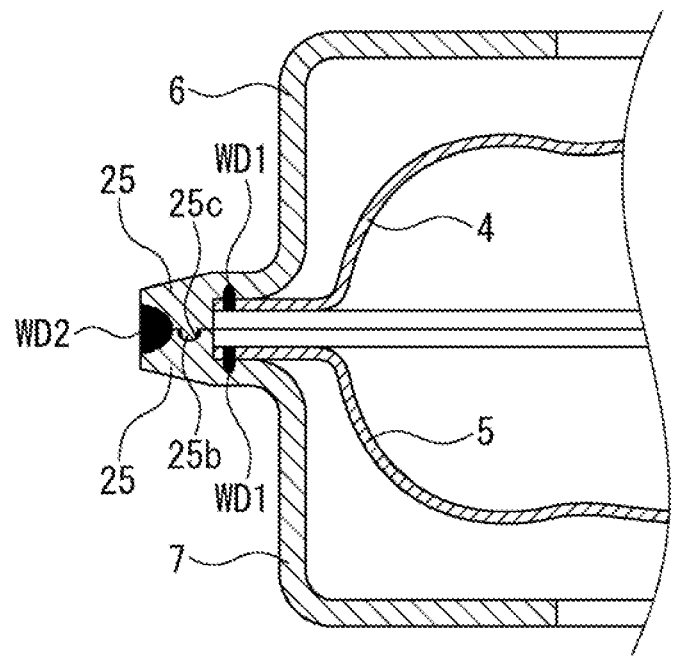
FIG. 10 is a cross-sectional view showing a first example modification of the metal diaphragm damper, that corresponds to a metal diaphragm damper according to a fifth embodiment of the present invention.

Like a first example modification shown in FIG. 10 (might be referred to as a fifth embodiment of the present invention), a ridge 25b may be provided on an inner surface 25a of one of annular periphery portions (here, referred to as an annular periphery portion 25 of a regulation member 6), and a recessed groove 25c may be provided on an inner surface 25a of the other annular periphery portion (here, referred to as an annular part 25 of a regulation member 7). In this case, by fitting the ridge 25b into the recessed groove 25c, the positioning of the annular periphery portion 25 of the regulation member 6 to the annular periphery portion 25 of the regulation member 7 can be performed, leading to easy welding in the third welding step.

Figure 11:
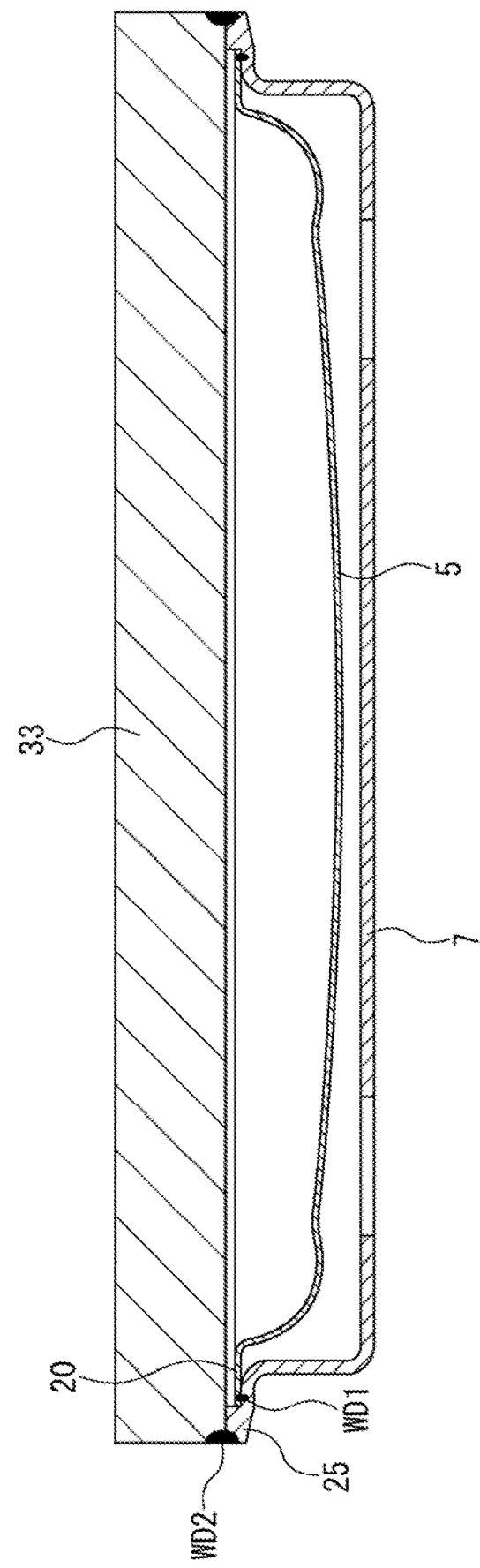
FIG. 11 is a cross-sectional view showing a second example modification of the metal diaphragm damper, that corresponds to a metal diaphragm damper according to a sixth embodiment of the present invention.

In the foregoing embodiments, the metal diaphragm damper 1 is described in the configuration in which the annular periphery portions 25 of the regulation members 6 and 7 with the outer edge portions 20 of the diaphragms 4 and 5 fixed to each other by welding are further fixed by welding and thus the fuel pressure in the fuel chamber 11 is absorbed on both sides of the diaphragm 4 and the diaphragm 5. However, the configuration is not limited to this. For example, like a second example modification shown in FIG. 11 (referred to as a sixth embodiment of the present invention), a configuration is provided in which in the state in which an annular periphery portion 25 of a regulation member 7 in which an outer edge portion 20 of a diaphragm 5 is fixed with a welding layer WD1 and a plate-shaped base member 33 are in surface contact throughout the circumference, the regulation member 7 is fixed to the base member 33 with a welding layer WD2. Such a metal diaphragm damper is used in the case in which the metal diaphragm damper is fixed to the top end of the fuel chamber 11, and the fuel pressure in the fuel chamber 11 is absorbed only on one side of the diaphragm 5.

In the embodiments, the metal diaphragm damper 1 is described in the form in which the metal diaphragm damper 1 is provided in the fuel chamber 11 of the high-pressure fuel pump 10 to reduce pulsation in the fuel chamber 11. However, not limited to this, the metal diaphragm damper 1 may reduce pulsation by being provided in a fuel pipe, for example, that is connected to the high-pressure fuel pump 10.

A configuration may be provided in which contact of the diaphragm 4 with the diaphragm 5 at a high pressure is prevented by disposing a core material made of an elastically deformable synthetic resin, for example, in the enclosed space (i.e., in the inside of the metal diaphragm damper 1) formed between the connected diaphragm 4 and the diaphragm 5.

In the embodiments, a form is described in which the first and second welding steps are performed in the atmosphere made of air and the third welding step is performed in the atmosphere made of a gas to be sealed in the damper main body 2. However, the first and second welding steps may be performed in the atmosphere of the gas to be sealed in the damper main body 2 as well.

REFERENCE SIGNS LIST

1 Metal diaphragm damper
2 Damper main body
3 Cover member
4, 5 Diaphragm
6, 7 Regulation member 10 High-pressure fuel pump
11 Fuel chamber
12 Plunger
13 Suction valve
14 Pressurizing chamber
15 Discharge valve
19 Deformable portion
20 Outer edge portion
20a Outer surface
20b Inner surface
25 Annular periphery portion
25a inner surface
27 Side wall portion part
28 Bottom part
29 Recess
29a Recess bottom surface
29b Recess inner surface
30 Hole
31 Support member
31a Opening
WD1 First and second welding layers (first welding part)
WD2 Welding layer (second welding part)

The invention claimed is:

1. A metal diaphragm damper comprising:
a damper main body formed in a disc shape and including a first diaphragm and a second diaphragm between which a gas is sealed and each of which is provided with a deformable portion at a center thereof;
a first regulation member disposed outside the deformable portion of the first diaphragm;
a second regulation member disposed outside the deformable portion of the second diaphragm;
a first welding part provided with a first welding layer that is formed by welding to seal an annular periphery portion of the first regulation member and an outer edge portion of the first diaphragm, and a second welding layer that is formed by welding to seal an annular periphery portion of the second regulation member and an outer edge portion of the second diaphragm; and
a second welding part provided with a welding layer that is formed by welding to seal the annular periphery portions of the first and second regulation members, wherein
each of the annular periphery portions of the first and second regulation members has a recess formed in each of inner surfaces of the annular periphery portions facing to each other on radially inner sides of the annular periphery portions, respectively,
the outer edge portions of the first and second diaphragms are disposed in the recesses of the first and second regulation members, respectively, and
depths of the recesses of the first and second regulation members in an axial direction are substantially equal to thicknesses of the outer edge portions of the first and second diaphragms, respectively.

2. The metal diaphragm damper according to claim 1, wherein an outer diameter of the annular periphery portion of the first regulation member is formed larger than an outer diameter of the first diaphragm, an outer diameter of the annular periphery portion of the second the regulation member is formed larger than an outer diameter of the second diaphragm, and the second welding part is located radially outward with respect to the outer edge portions of the first and second diaphragms.

3. The metal diaphragm damper according to claim 2, wherein
the first diaphragm includes a curved portion formed between the deformable portion and the outer edge portion of the first diaphragm and protruding from the annular periphery portion of the first regulation member in a direction opposite to a protruding direction of the deformable portion of the first diaphragm in a natural state of the first diaphragm, and
the second diaphragm includes a curved portion formed between the deformable portion and the outer edge portion of the second diaphragm and protruding from the annular periphery portion of the second regulation member in a direction opposite to a protruding direction of the deformable portion of the second diaphragm in a natural state of the second diaphragm.

4. The metal diaphragm damper according to claim 1, wherein
the first diaphragm includes a curved portion formed between the deformable portion and the outer edge portion of the first diaphragm and protruding from the annular periphery portion of the first regulation member in a direction opposite to a protruding direction of the deformable portion of the first diaphragm in a natural state of the first diaphragm, and
the second diaphragm includes a curved portion formed between the deformable portion and the outer edge portion of the second diaphragm and protruding from the annular periphery portion of the second regulation member in a direction opposite to a protruding direction of the deformable portion of the second diaphragm in a natural state of the second diaphragm.

5. A metal diaphragm damper comprising:
a damper main body formed in a disc shape and including a first diaphragm and a second diaphragm between which a gas is sealed and each of which is provided with a deformable portion at a center thereof;
a first regulation member disposed outside the deformable portion of the first diaphragm;
a second regulation member disposed outside the deformable portion of the second diaphragm;
a first welding part provided with a first welding layer that is formed by welding to seal an annular periphery portion of the first regulation member and an outer edge portion of the first diaphragm, and a second welding layer that is formed by welding to seal an annular periphery portion of the second regulation member and an outer edge portion of the second diaphragm; and
a second welding part provided with a welding layer that is formed by welding to seal the annular periphery portions of the first and second regulation members, wherein
the first diaphragm includes a curved portion formed between the deformable portion and the outer edge portion of the first diaphragm and protruding from the annular periphery portion of the first regulation member in a direction opposite to a protruding direction of the deformable portion of the first diaphragm in a natural state of the first diaphragm, and
the second diaphragm includes a curved portion formed between the deformable portion and the outer edge portion of the second diaphragm and protruding from the annular periphery portion of the second regulation member in a direction opposite to a protruding direction of the deformable portion of the second diaphragm in a natural state of the second diaphragm.

6. A method of manufacturing a metal diaphragm damper comprising a damper main body with a disk shape including a first diaphragm and a second diaphragm between which a gas is sealed and each of which is provided with a deformable portion at a center thereof; a first regulation member disposed outside the deformable portion of the first diaphragm; and a second regulation member disposed outside the deformable portion of the second diaphragm, the method comprising:

- a first welding step of fixing an annular periphery portion of the first regulation member to an outer edge portion of the first diaphragm by welding;
- a second welding step of fixing an annular part of the second regulation member to an outer edge portion of the second diaphragm by welding; and
- a third welding step of fixing the annular parts of the first and second regulation members by welding after the first and second steps, wherein
- the first welding step and the second welding step are performed in an atmosphere made of air, and the third welding step is performed in an atmosphere made of the gas to be sealed between the first and second diaphragms.

\* \* \* \* \*